G. WILLIAMSON.
HYDROPNEUMATIC PUMP FOR DIVING BELLS.
No. 14,039. Patented Jan. 1, 1856.
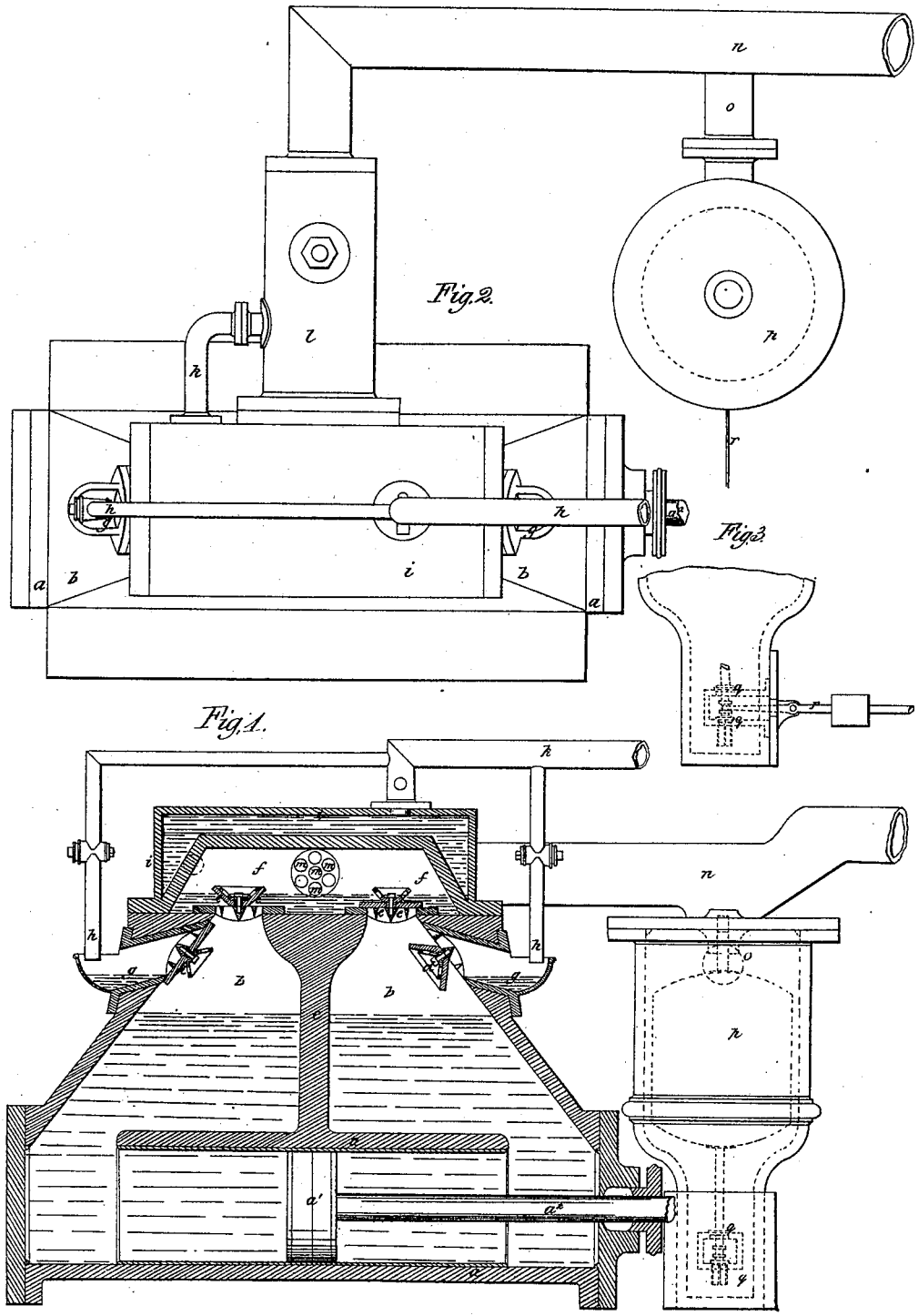

UNITED STATES PATENT OFFICE.

GEORGE WILLIAMSON, OF BROOKLYN, NEW YORK.

HYDROPNEUMATIC PUMP FOR DIVING-BELLS.

Specification of Letters Patent No. 14,039, dated January 1, 1856.

*To all whom it may concern:*

Be it known that I, GEORGE WILLIAMSON, of Brooklyn, in the county of Kings and State of New York, have invented certain new and useful improvements in constructing air-pumps for diving-bells and like purposes where compressed air is used, by which I keep the air refrigerated by extracting the caloric therefrom as it is compressed; and I do hereby declare the following to be a full, clear, and exact description thereof, reference being had to the accompanying drawing, in which—

Figure 1, is a vertical section through the main parts of the pump and float, or waste reservoir. Fig. 2, is a top plan. Fig. 3, is an end elevation.

My improvements are for the purpose of supplying the leakage water to the air pump, and thus keeping the valves moist and tight, and disposing of the surplus water which is forced through the pump with the air; and secondly, cooling the air by surrounding the valve chamber with water, and causing the air to pass therefrom to the condenser through a cooler supplied with cold water, which is absolutely necessary to prevent making steam and thus stopping the action of the pump at high densities.

The construction of this apparatus is as follows: There is a cylinder ($a$), opening at either end into a chamber, ($b$); these chambers ($b$,) are separated by a partition ($c$), and are in form of a truncated pyramid. On the side of each of these chambers there is a valve opening inward, and lettered ($d$); and at the top are valves ($e$), opening outward, into a valve chamber ($f$). Outside of the opening of the valve ($d$) there is a cap, ($g$,) in which the end of a branch of the water supply pipe ($h$) terminates. A small stream of water issues from this pipe into the cup, and is drawn from it with the air into the chamber ($b$), to supply the waste water in the operation of pumping. The valve-chamber ($f$) is covered with a jacket ($i$), having a space between it and the valve chamber that is filled with water from the water pipe ($h$), which affords a stream of cold water to carry off the heat from the condensed air which is forced into it. The water passes from this water space by a pipe ($k$) to a drum ($l$) (which contains a series of pipes ($m$) opening into the eduction air pipe from the valve chamber) and flows around their exterior surface, from whence it extracts the remaining heat in the air passing through said pipes. This water is conducted off to a heater for the steam engine, or runs to waste. The air, and a small portion of water is forced up by the stroke of the piston ($a'$), which fills the chamber ($b$) with water, and thus expels the air, throwing over a small portion of water with it. This keeps the valves wet and tight. The air and water thus discharged, after passing through the small tubes in the drum, and being cooled, is forced downward to the depression in the air-pipe at ($n$), whence the water falls and passes through a branch pipe ($o$) into the float reservoir, gradually filling it till the float ($p$) rises and lifts the balance valves ($q$) off their seat, and the water flows out. The weight of this apparatus is to be determined by the pressure of the condensed air and water, which weight is regulated by a lever ($r$) passing in through the discharge pipe to the valve stem, to which it is jointed. As the weight applied to this lever at the opposite end is moved to or from the fulcrum, it has more or less action upon the valves. The valves are both firmly affixed to the same stem, the lower one being small enough to pass through the seat of the upper one, and the difference thereby made in their pressure is overcome by the before named lever ($r$). The air, after having the water separated from it as above, enters the reservoir or condenser therefor, of ordinary construction, and not shown in the drawing.

The piston rod ($a^2$) connects the piston ($a'$) with a steam engine, by which it is driven, from end to end of the cylinder. There is always a sufficiency of water in the cylinder, and chamber ($b$) to fill the latter. After the water is all expelled from the cylinder, and when the piston recedes to the opposite end of the cylinder, the water flows in behind it, and draws in its equivalent in bulk of air and water through valve ($d$). On its return this is forced out of valve ($e$) into the chamber ($f$), before named. The water being non-elastic, if the parts are kept cool enough not to raise steam, allows this process to be continued, but for this cooling process the water packing becomes rapidly heated and rising steam stops the pumping of air.

Having thus fully described my improved apparatus for condensing air into receivers or condensers, what I claim therein as new, and for which I desire to secure Letters Patent is—

1. The arrangement and combination of the pump, cylinder chamber (*b*) and their valve arrangement, by which a proper supply of water is kept up, and the air pumped, as specified.

2. I also claim refrigerating the air by extracting the caloric therefrom, after it has passed the pump, by means of the water bath surrounding the valve chamber and eduction tubes, substantially as set forth.

3. I also claim the float reservoir connected with the eduction-pipe for separating the water from the air, as specified.

GEORGE WILLIAMSON.

Witnesses:
JACOB HATZEL,
HEYWOOD M. SUMMERS.